US012766782B2

(12) United States Patent
Yamamoto et al.

(10) Patent No.: US 12,766,782 B2
(45) Date of Patent: Oct. 20, 2026

(54) INKJET PRINTING METHOD AND INKJET PRINTING DEVICE

(71) Applicant: 3M INNOVATIVE PROPERTIES COMPANY, St. Paul, MN (US)

(72) Inventors: Takeo Yamamoto, Tendo-City (JP); Koji Saito, Higashine-City (JP); Katsuya Ono, Tendo-City (JP); Shinya Ohtomo, Higashine (JP)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 18/713,769

(22) PCT Filed: Nov. 30, 2022

(86) PCT No.: PCT/IB2022/061606
§ 371 (c)(1),
(2) Date: May 28, 2024

(87) PCT Pub. No.: WO2023/105354
PCT Pub. Date: Jun. 12, 2023

(65) Prior Publication Data

US 2025/0026075 A1 Jan. 23, 2025

(30) Foreign Application Priority Data

Dec. 9, 2021 (JP) ................................ 2021-200359

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/386* (2017.08);
(Continued)

(58) Field of Classification Search
CPC ... B29C 64/112; B29C 64/209; B29C 64/386; B33Y 10/00; B33Y 30/00; B33Y 50/00;
(Continued)

(56) References Cited

U.S. PATENT DOCUMENTS 6,164,756 A 12/2000 Takahashi
8,356,882 B2 * 1/2013 Saito ........................ B41J 29/38 347/41
(Continued)

FOREIGN PATENT DOCUMENTS

JP 2004268326 A 9/2004
JP 2006015691 A 1/2006
(Continued)

OTHER PUBLICATIONS

Connected Components information from Wikipedia, 12 Pages.
International Search report for PCT International Application No. PCT/IB2022/061606, mailed on Jan. 31, 2023, 3 pages.

*Primary Examiner* — Nahida Sultana
(74) *Attorney, Agent, or Firm* — Lance Vietzke

(57) ABSTRACT

Provided are an inkjet printing method and an inkjet printing device that can reduce or suppress an unintended crease defect corresponding to a movement direction of a print
(Continued)

head. An inkjet printing method of an embodiment of the present disclosure is a printing method of printing an image on a printing medium by a scanning system.

10 Claims, 9 Drawing Sheets

(51) Int. Cl.

| | |
|---|---|
| ***B29C 64/386*** | (2017.01) |
| ***B33Y 10/00*** | (2015.01) |
| ***B33Y 30/00*** | (2015.01) |
| ***B33Y 50/00*** | (2015.01) |
| ***B41J 2/045*** | (2006.01) |
| ***B41J 2/15*** | (2006.01) |
| ***B41J 2/21*** | (2006.01) |
| ***B41M 7/00*** | (2006.01) |

(52) U.S. Cl.
CPC ............... *B33Y 10/00* (2014.12); *B33Y 30/00* (2014.12); *B33Y 50/00* (2014.12); *B41J 2/04526* (2013.01); *B41J 2/04586* (2013.01); *B41J 2/15* (2013.01); *B41J 2/2103* (2013.01); *B41M 7/0081* (2013.01)

(58) Field of Classification Search
CPC ...... B41J 2/04526; B41J 2/04586; B41J 2/15; B41J 2/2103; B41J 11/00214; B41J 2/2132; B41J 2/17; B41J 2/205; B41J 2/21; B41M 7/0081
See application file for complete search history.

(56) References Cited

U.S. PATENT DOCUMENTS

| | | | | |
|---|---|---|---|---|
| 8,699,070 | B2 | 4/2014 | Takeuchi | |
| 9,254,692 | B2 * | 2/2016 | Fujimoto | B41J 2/2132 |
| 12,001,900 | B2 | 6/2024 | Yamamoto et al. | |
| 2012/0050369 | A1 | 3/2012 | Seki | |
| 2015/0332131 | A1 | 11/2015 | Oya | |
| 2016/0236411 | A1 | 8/2016 | Ohnishi | |
| 2016/0288490 | A1 * | 10/2016 | Okajima | B41J 2/04586 |
| 2019/0299608 | A1 | 10/2019 | Maehira | |
| 2020/0050908 | A1 | 2/2020 | Ohara | |
| 2021/0300031 | A1 * | 9/2021 | Kawafuji | B41J 25/006 |
| 2022/0371335 | A1 | 11/2022 | Yamamoto et al. | |
| 2023/0311483 | A1 * | 10/2023 | Kabeya | B41J 2/0451 347/14 |

FOREIGN PATENT DOCUMENTS

| | | | |
|---|---|---|---|
| JP | 2009285854 | A | 12/2009 |
| JP | 2010188709 | A | 9/2010 |
| JP | 2011240530 | A | 12/2011 |
| JP | 2012040837 | A | 3/2012 |
| JP | 2012141919 | A | 7/2012 |
| JP | 5187000 | B2 | 4/2013 |
| JP | 5652744 | B2 | 1/2015 |
| JP | 2019181893 | A | * 10/2019 |
| JP | 2021053895 | A | 4/2021 |
| JP | 2021062531 | A | 4/2021 |

* cited by examiner (b)

(a)

INKJET PRINTING METHOD AND INKJET PRINTING DEVICE

CROSS REFERENCE TO RELATED APPLICATIONS

This application is a national stage filing under 35 U.S.C. 371 of PCT/IB2022/061606, filed Nov. 30, 2022, which claims the benefit of Japan Application No. 2021-200359, filed Dec. 9, 2021, the disclosures of which are incorporated by reference in their entireties herein.

TECHNICAL FIELD

The present disclosure relates to an inkjet printing method and an inkjet printing device.

BACKGROUND ART

In recent years, various types of inkjet printing methods and inkjet printing devices have been developed.

Patent Document 1 (JP 2011-240530 A) describes an inkjet recording method including the gloss forming step of forming a glossy region in a topmost surface layer by discharging ultraviolet light curable ink onto a recording medium, and the gloss forming step includes forming the glossy region in a region of at least a portion of the recording medium, assuming that a diameter of a dot of the ultraviolet light curable ink in the topmost surface layer is set as a distance that is greater than or equal to $2^{1/2}$ times a distance between dot centers of dots adjacent to each other of the ultraviolet light curable ink.

Patent Document 2 (JP 2006-015691 A) describes a printing method using an inkjet printer using UV curable ink, and in the printing method, a picture and/or a character formed of an array of a plurality of ink dots of UV curable ink are printed on a surface of a recording medium by using an inkjet printer using UV curable ink, and then the surface of the recording medium on which the picture and/or the character are printed is covered with a clear coat layer formed of transparent or semi-transparent clear ink containing, as a main component, a resin having a refractive index identical to or approximately identical within an error range of ±0.5 to a resin contained as an ink main component in the plurality of ink dots of the UV curable ink.

Patent Document 3 (JP 2021-062531 A) describes an inkjet printing method for forming, on a printing surface, a decorative printed layer having three-dimensional texture, and the method includes the steps of printing dots of curable ink that cures under predetermined conditions, based on dot pattern data indicating printing positions of dots to be printed on the printing surface, and curing the dots printed, and the dot pattern data indicates that in a first region, a distance between the dots adjacent to each other is a distance by which the dots adjacent to each other before curing can be maintained independently without being coupled with each other, and in a second region different from the first region, a distance between the dots adjacent to each other is a distance by which the dots adjacent to each other before curing are coupled with each other.

SUMMARY OF INVENTION

In a conventional inkjet printing method of printing an image on a printing medium by scanning system, the printing medium is fed by a predetermined distance, and then a print head scans the printing medium while passing through a printing pass region, and at this time, in a case where an image to be printed is present in the printing pass region and even when only a portion of the image is present in the printing pass region, the portion of the image is printed during scan.

For example, as illustrated in FIG. 1, during scan 1, a portion of constituent part 1 of an image is present in a printing pass region 1. At this time, during scan 1, the portion of constituent part 1 in the printing pass region 1 is printed, and during subsequent scan 2, all of constituent part 1 and a portion of constituent part 2 in a printing pass region 2 are printed. As illustrated in FIG. 1, in such a conventional printing method, an unintended crease defect corresponding to a movement direction of the print head may be generated on an image.

The present disclosure provides an inkjet printing method and an inkjet printing device that can reduce or suppress an unintended crease defect corresponding to a movement direction of a print head.

According to an embodiment of the present disclosure, an inkjet printing method of printing an image on a printing medium by a scanning system is provided, and the inkjet printing method includes

- extracting one constituent part or a plurality of constituent parts of an image from image data of the image, and
- scanning across a printing pass region in a primary scanning direction by a print head in accordance with the number of times of actual feeding of a printing medium that is sequentially fed n times by a predetermined distance in a secondary scanning direction, assuming that a direction of a nozzle row in the print head having the nozzle row constituted of an array of a plurality of nozzles is the secondary scanning direction, and that a direction substantially perpendicular to the secondary scanning direction is the primary scanning direction,
- the scanning including printing all of the constituent part of the image by discharging ink during scan, when the constituent part of the image is present in a printing pass region that is scannable by the print head passing over the printing medium, and in a case where all of the constituent part of the image is present in the printing pass region.

According to another embodiment of the present disclosure, an inkjet printing device of printing an image on a printing medium by a scanning system is provided, and the inkjet printing device includes

- a print head having a nozzle row constituted of an array of a plurality of nozzles,
- a feeder configured to sequentially feed the printing medium n times by a predetermined distance in a secondary scanning direction, assuming that a direction of the nozzle row in the print head is the secondary scanning direction, and that a direction substantially perpendicular to the secondary scanning direction is a primary scanning direction,
- a receiver configured to receive a signal of one constituent part or a plurality of constituent parts of an image that are extracted from image data of the image, and
- a scan controlling unit configured to cause the print head to scan across a printing pass region in the primary scanning direction in accordance with the number of times of actual feeding of the printing medium that is fed by the feeder,
- the scan controlling unit causing the printing device to execute to print all of a constituent part of an image received by the receiver by discharging ink during scan, when the constituent part of the image is present in a printing pass region that is scannable by the print head passing over the printing medium, and in a case where all of the constituent part of the image is present in the printing pass region.

According to the present disclosure, an inkjet printing method and an inkjet printing device that can reduce or suppress an unintended crease defect corresponding to a movement direction of a print head can be provided.

The above description is not to be construed as disclosure of all embodiments of the present invention and all advantages relating to the present invention.

DESCRIPTION OF EMBODIMENTS

Hereinafter, representative embodiments of the present invention will be described in more detail with reference to the drawings, as necessary, for the purpose of illustration, but the present invention is not limited to these embodiments.

In the present disclosure, a "constituent part of an image" means one portion or a plurality of portions that can be identified as one set in an image to be printed on a printing medium. For example, in FIG. 7, an image on the left side to be printed on a printing medium can be divided into twelve image blocks as illustrated on the right side, and each of these twelve image blocks divided corresponds to a constituent part of the image. Here, the "constituent part" can also be referred to as a "chunk."

Figure 1:
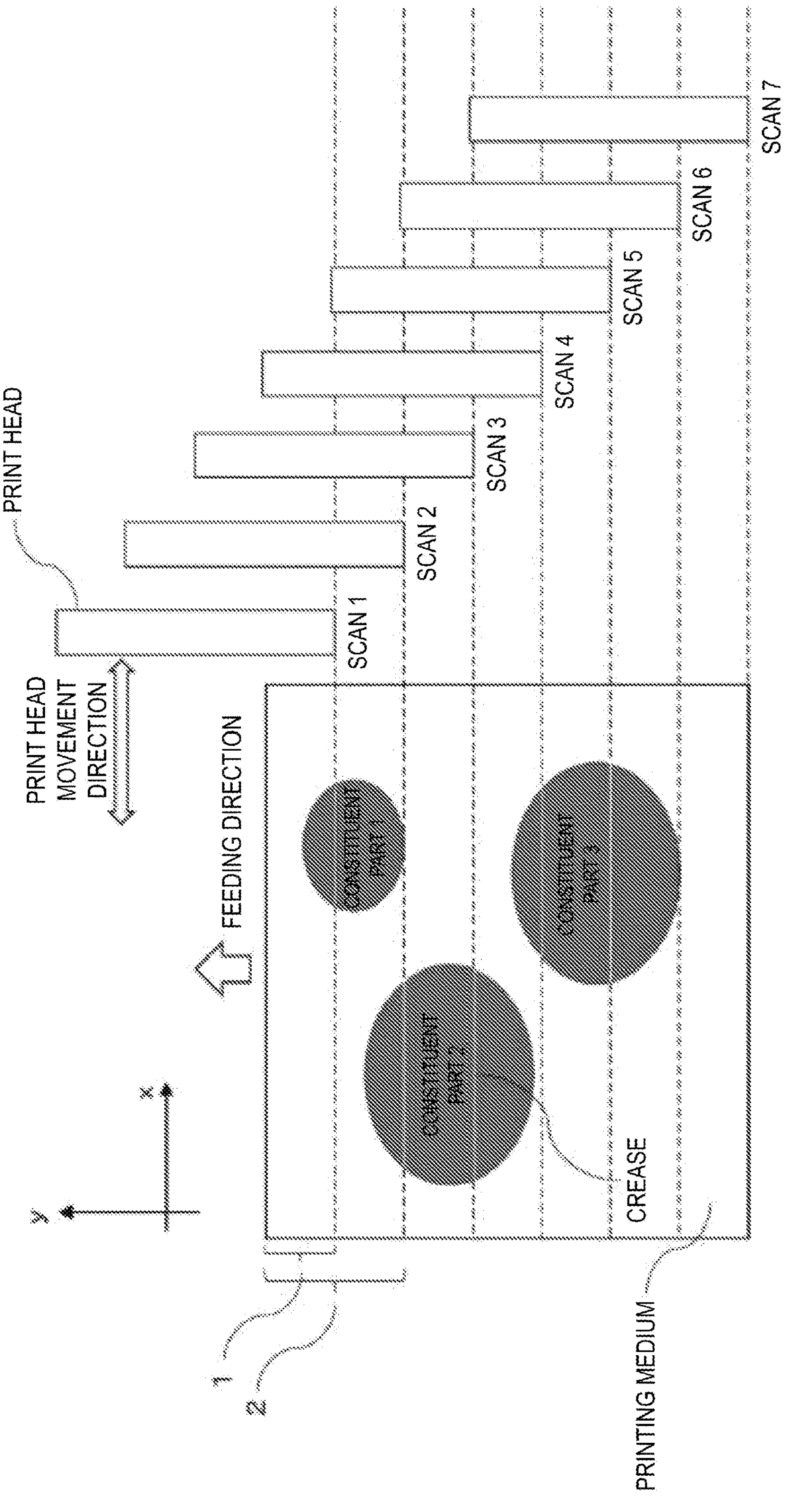
FIG. 1 is a schematic drawing of an image obtained by scanning and printing by using a conventional inkjet printing method and printing device of a scanning system.
Figure 3:
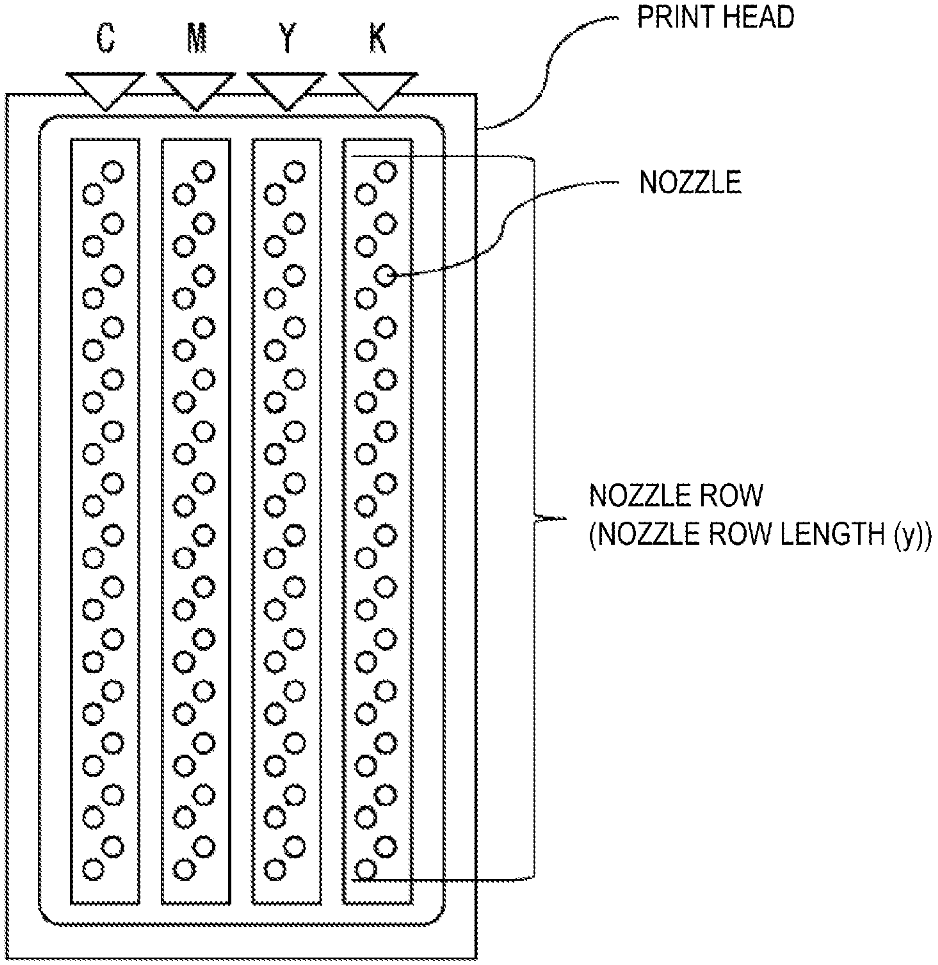
FIG. 3 is a schematic drawing of a print head.

In the present disclosure, a "printing pass region" is intended to mean a region printable by a print head passing over a printing medium. For example, as illustrated in FIG. 1, a print head can move in a primary scanning direction, and during scan 1, a region indicated by a number 1 on an upper side in a feeding direction of a printing medium corresponds to a printing pass region, and during scan 2, a region indicated by a number 2 of the printing medium corresponds to a printing pass region. Here, the "primary scanning direction" means a direction of a nozzle row in a print head having the nozzle row constituted of an array of a plurality of nozzles as illustrated in FIG. 3, or means a direction (for example, +x direction of FIG. 1) substantially perpendicular to a secondary scanning direction as illustrated in FIG. 1, assuming that the feeding direction (+y direction) of the printing medium is the secondary scanning direction.

In the present disclosure, "substantially" means including variation caused by a production error or the like, and means that variation of approximately ±20% is allowed.

Figure 2:
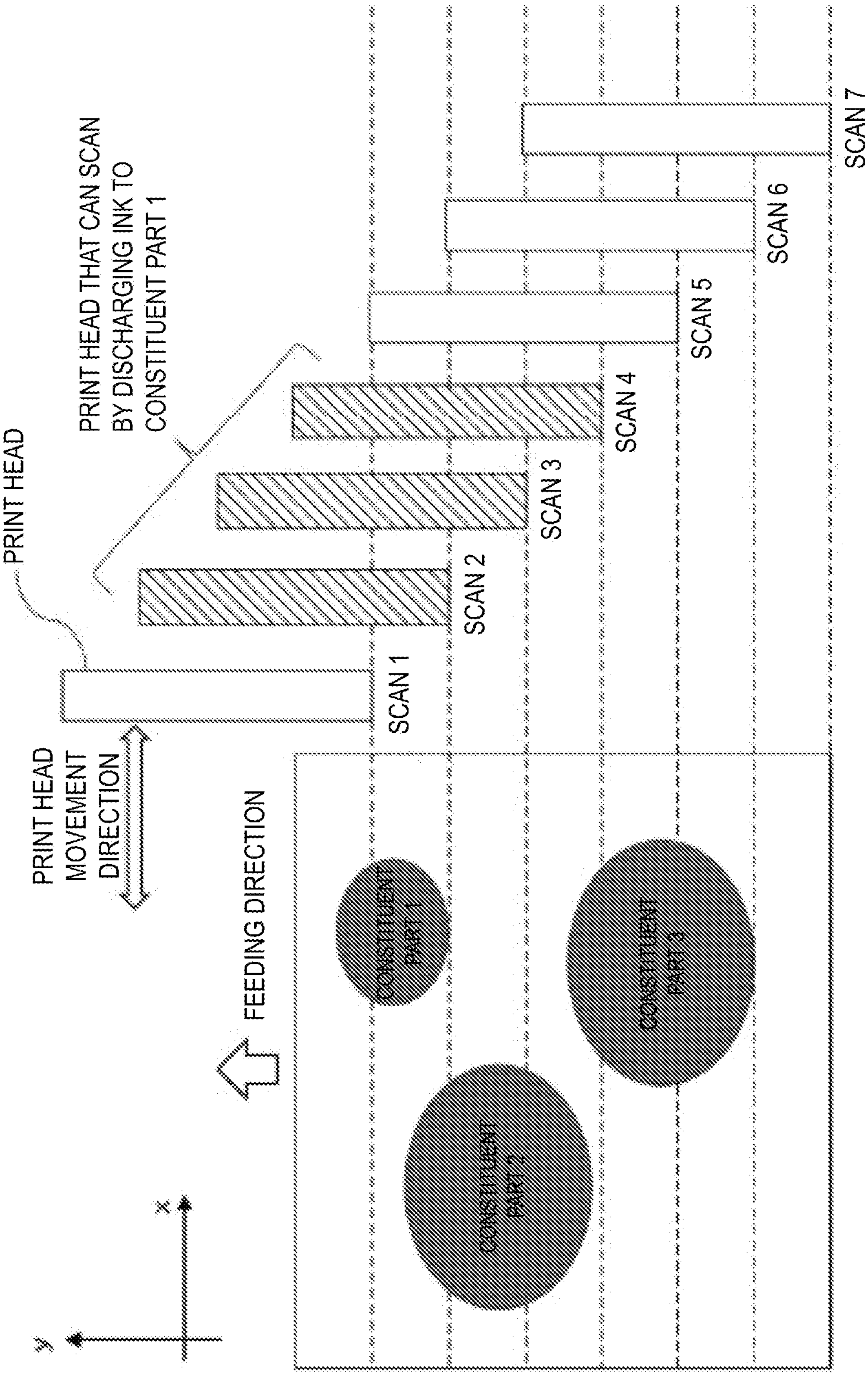
FIG. 2 is a schematic drawing of an image obtained by scanning and printing by using an inkjet printing method and printing device of a scanning system of an embodiment of the present disclosure.

In the present disclosure, "scan" means an operation in which when a print head moves, the print head discharges or does not discharge ink. For example, as illustrated in FIG. 2, during scan 1, the print head may move in the primary scanning direction, but does not discharge ink. On the other hand, during scan 2, while the print head moves in the primary scanning direction, the print head may discharge ink to a location of constituent part 1, but does not discharge ink to a location of constituent part 2. Note that, for example, in a case where no ink is required to be discharged as illustrated in scan 1 of FIG. 2, scan 1 may be skipped, that is, during scan 1, the print head may not move. The "scan" of the present disclosure also encompasses such an operation of skipping scan.

In the present disclosure, "three-dimensional printing" refers to a printing method of printing while heaping up a constituent part of an image to have a predetermined height from a printing medium. "Three-dimensional printing" in the present disclosure may generally encompass printing methods referred to as 2.5-dimensional printing and three-dimensional printing.

In the present disclosure, "gloss printing" refers to a printing method of printing to obtain a constituent part of an image that exhibits glossiness. Here, the glossiness can be evaluated by an average value of 60 degree gloss at any three points measured in accordance with JIS Z8741 by a portable glossmeter GMX-202 manufactured by Murakami Color Research Laboratory. Such 60 degree gloss can be, for example, greater than or equal to 30, greater than or equal to 40, greater than or equal to 50, or greater than or equal to 60, and can be less than or equal to 100, or less than 100.

In the present disclosure, "transparent" refers to an average transmittance in a visible light region (wavelength from 400 nm to 700 nm) measured in accordance with JIS K 7375 of approximately greater than or equal to 80%, and the average transmittance may be desirably approximately greater than or equal to 85%, or approximately greater than or equal to 90%. An upper limit of the average transmittance is not particularly limited, and can be, for example, approximately less than 100%, approximately less than or equal to 99%, or approximately less than or equal to 98%.

In the present disclosure, "translucent" refers to an average transmittance in a visible light region (wavelength from 400 nm to 700 nm) measured in accordance with JIS K 7375 of approximately less than 80%, and the average transmittance may be desirably approximately less than or equal to 75%, and "translucent" is intended to mean that an underlying layer is not completely hidden.

Hereinafter, an inkjet printing method and an inkjet printing device of the present disclosure will be described with reference to the drawings as necessary. In the present disclosure, the inkjet printing method and the inkjet printing device may be referred to simply as a "printing method" and a "printing device."

The inkjet printing method of the present disclosure is a method of printing an image on a printing medium by a scanning system, and the method includes at least the following steps (1) and (2):

(1) the step of extracting one constituent part or a plurality of constituent parts of an image from image data of the image (may be referred to simply as the "extraction step"), and (2) the step of scanning (may be referred to simply as the "scanning step") across a printing pass region in a primary scanning direction by a print head in accordance with the number of times of actual feeding of a printing medium that is sequentially fed n times by a predetermined distance in a secondary scanning direction, assuming that a direction of a nozzle row in the print head having the nozzle row constituted of an array of a plurality of nozzles is the secondary scanning direction, and that a direction substantially perpendicular to the secondary scanning direction is the primary scanning direction, the scanning including printing all of the constituent part of the image by discharging ink during scan, when the constituent part of the image is present in a printing pass region that is scannable by the print head passing over the printing medium, and in a case where all of the constituent part of the image is present in the printing pass region.

Figure 5:
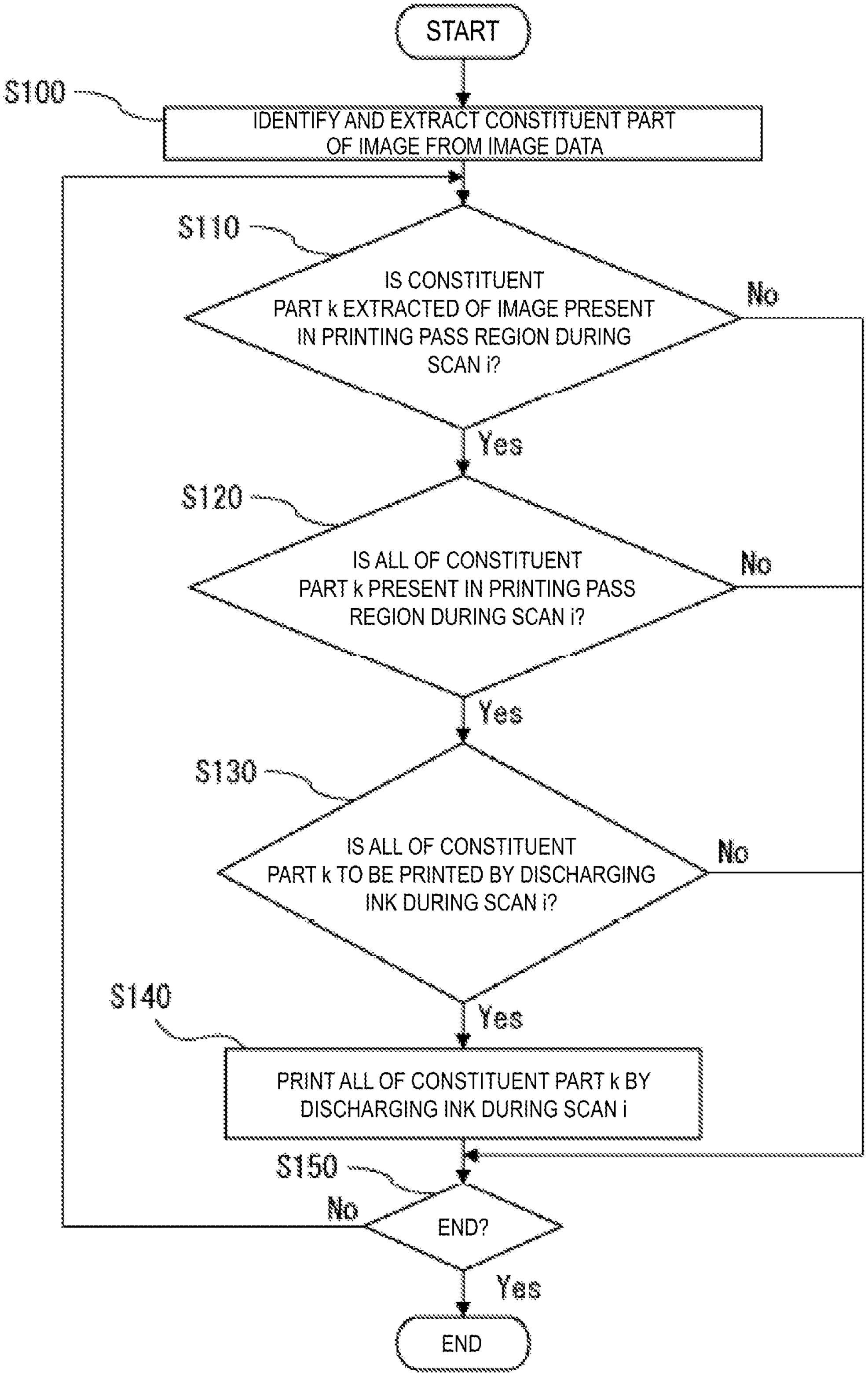
FIG. 5 is a flowchart illustrating contents of an inkjet printing method of an embodiment of the present disclosure.

Here, as illustrated in a flowchart of FIG. 5, the extraction step described above may correspond to step S100, and the scanning step described above may correspond to steps S110 to S150. In the flowchart, "k" of constituent part k is intended to mean a number of an extracted constituent part (for example, "1" of constituent part 1 of FIG. 1, and the like), and "i" of scan i is intended to mean a number of scan (for example, "1" in scan 1 of FIG. 1, and the like).

In a conventional inkjet printing method, for example, as illustrated in FIG. 1, when a portion of constituent part 1 of an image is present in a printing pass region 1, the portion of constituent part 1 is printed during scan 1, and during subsequent scan 2, all of constituent part 1 and a portion of constituent part 2 in a printing pass region 2 are printed. As a result, as illustrated in FIG. 1, an unintended crease defect (may be referred to as "banding") corresponding to the movement direction of the print head is easily generated on an image to be printed.

On the other hand, in the inkjet printing method of the present disclosure, even when an image to be printed is present in a printing pass region at the time of scanning, in a case where a constituent part of the image cannot be printed at once during single scan, the constituent part of the image is not printed, and all of the constituent part of the image is printed at the time of scanning at which the constituent part of the image can be printed at once. As a result, according to the printing method of the present disclosure, an unintended crease defect corresponding to the movement direction of the print head can be remedied suitably on an image to be printed.

The inkjet printing method of the present disclosure is a method of printing an image on a printing medium by a scanning system. Here, in the present disclosure, the "scanning system" encompasses a single-pass system in which printing is performed with single pass by securing a print head and moving a printing medium, or as illustrated in FIGS. 1 and 2, a multi-pass system in which printing is performed by moving a print head back and forth. Among others, the inkjet printing method of the present disclosure is advantageously employed to the multi-pass system in which banding is easily generated.

A material of a printing medium that can be used in the printing method and the printing device of the present disclosure is not particularly limited, and examples of the material can include paper, a resin, an inorganic material (for example, glass, ceramic), metal, and wood. A shape of the printing medium is not limited to a substantially flat shape such as a film, fabric, and a plate, and may be a three-dimensional shape having an uneven surface such as a building member (for example, a siding material). An ink application surface of the printing medium may be provided with an ink accommodating layer. A thickness of the printing medium is not particularly limited, and can be set appropriately in accordance with a use application and the like. Here, a "film" in the present disclosure encompasses a member referred to as a "sheet."

Ink that can be used in the printing method and the printing device of the present disclosure is not particularly limited, and examples of the ink can include transparent ink, translucent ink, and opaque ink. The transparent ink and the translucent ink may be colorless or may be colored. Colored ink can typically be used for colored transparent ink and translucent ink, and opaque ink. Examples of the colored ink can include CMYK ink (cyan ink, magenta ink, yellow ink, black ink), light cyan ink, light magenta ink, red ink, green ink, and orange ink.

Curable ink can be employed as the ink. Examples of the curable ink can include radiation curable ink and thermosetting ink. The curable ink can cure before the ink discharged wets and spreads on a printing medium, and thus can be used suitably in three-dimensional printing or the like. Examples of the radiation curable ink include compositions containing an (meth) acrylic monomer and a photopolymerization initiator. Here, in the present disclosure, "(meth)acrylic" means acrylic or methacrylic.

One type of ink or a plurality of types of ink can be loaded in the print head. In a case where a plurality of types of ink are loaded in the print head, at least one of the plurality of types of ink may be discharged according to the printing method of the present disclosure. For example, in a case where two types of ink of transparent ink and colored ink are loaded in the print head, only the transparent ink or only the colored ink may be discharged according to the printing method of the present disclosure, or both the transparent ink and the colored ink may be discharged according to the printing method of the present disclosure.

Printing performed by the printing method of the present disclosure is not particularly limited, and examples of the printing can include at least one selected from the group consisting of two-dimensional printing, three-dimensional printing, and gloss printing. The three-dimensional printing and the gloss printing are a printing method required to exhibit high expressiveness and the like, and in the case of such a printing method, a crease defect has significant influence. The inkjet printing method of the present disclosure can reduce or suppress such a defect also in the gloss printing and the three-dimensional printing in which a crease defect (banding) is easily generated or easily noticeable.

A method of extracting a constituent part of an image at the extraction step of the present disclosure is not particularly limited, and examples of the extraction method can include at least one selected from the group consisting of a blob labeling method, an edge detection method, a threshold method, and a method of extracting a region specified in advance.

Figure 7:
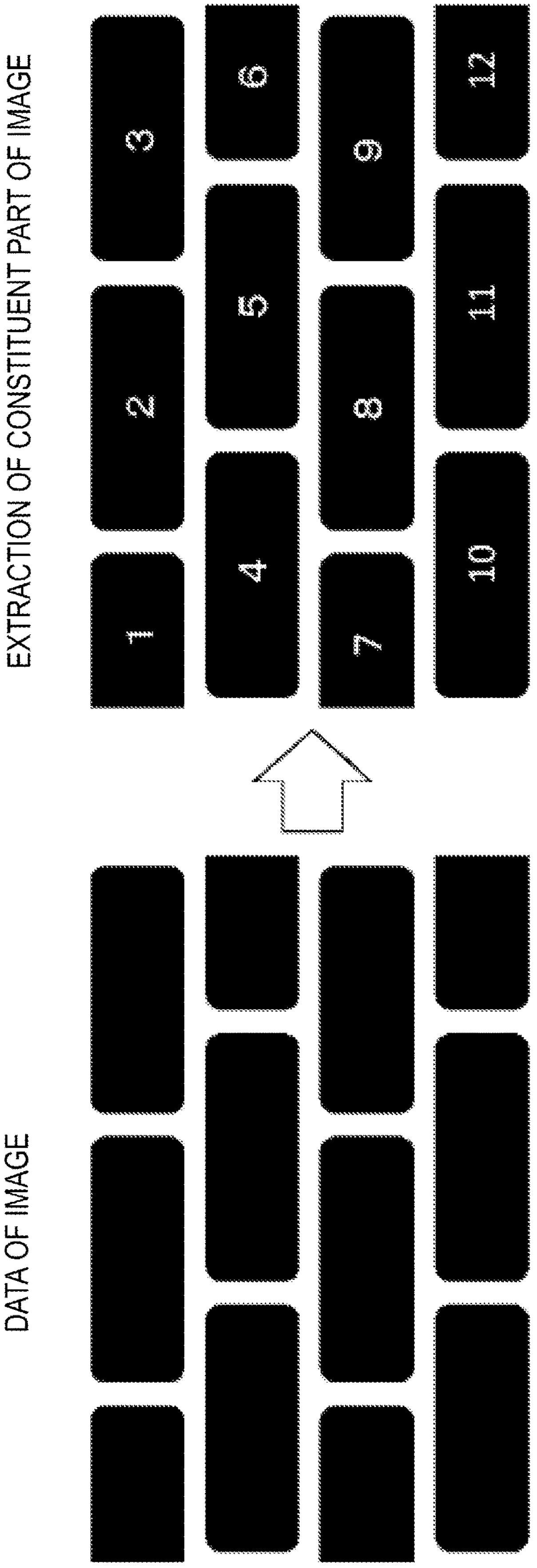
FIG. 7 is a view illustrating extraction of a constituent part of an image from image data by a blob labeling method.
Figure 8:
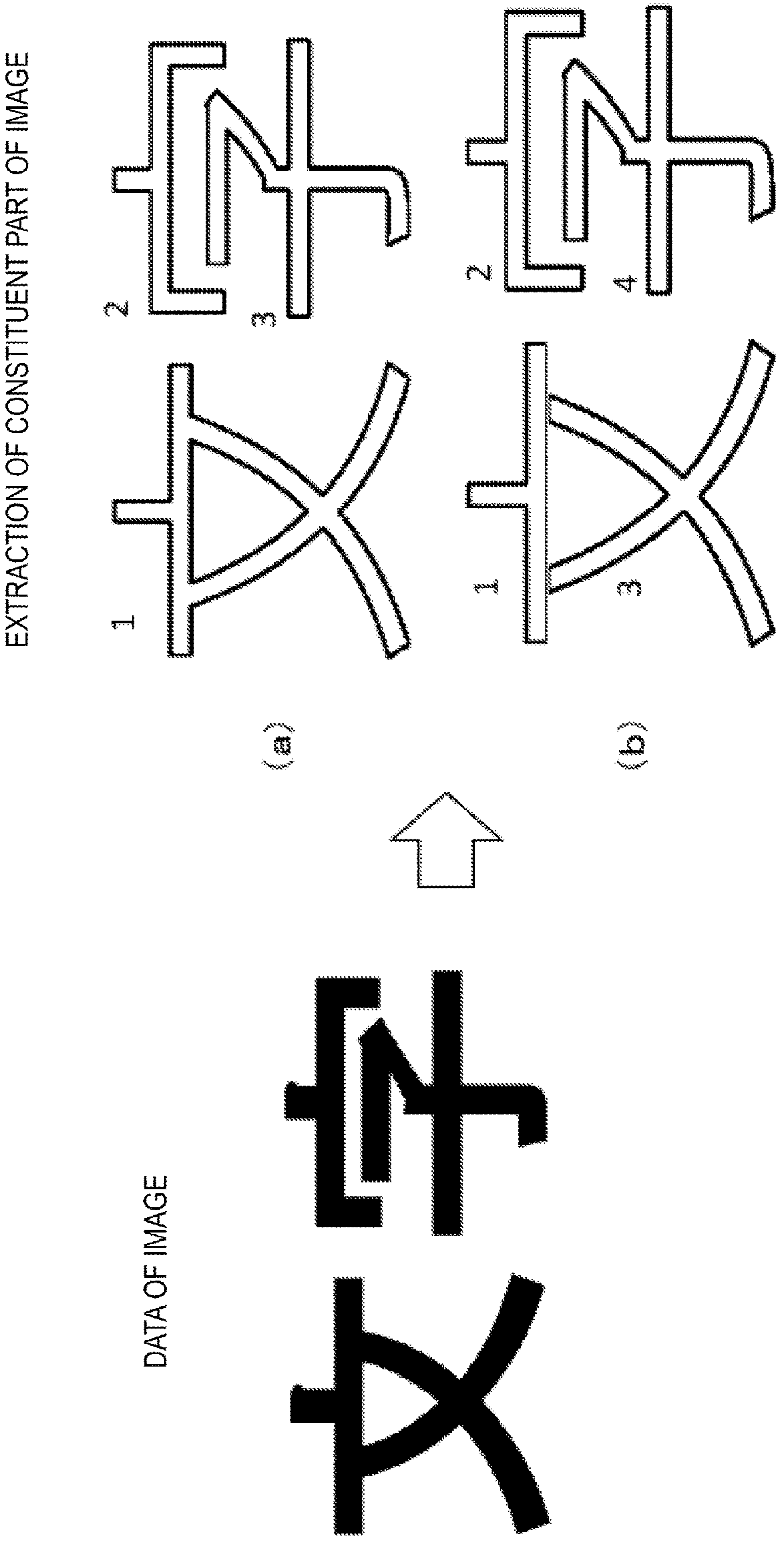
FIG. 8 is a view illustrating extraction of a constituent part of an image from image data, and FIG. 8(*a*) is a view illustrating extraction of a constituent part of an image from image data by a blob labeling method, and FIG. 8(*b*) is a view illustrating extraction of a region specified in advance from image data.

At the extraction step of the present disclosure, a known blob labeling method can be employed. The blob labeling method refers to a method including performing processing of assigning an identical number (may be referred to as "labeling") to pixels including continuous white portions (or black portions) in a binarized image, and identifying the image as one constituent part or a plurality of constituent parts. The blob labeling method includes two types of processing, and one type of the processing is 4-connection (may be referred to as "4-neighbor") in which longitudinally and laterally continuous portions of a binarized image are labeled as being identical, and the other type of the processing is 8-connection (may be referred to as "8-neighbor") in which longitudinally, laterally, and diagonally continuous portions of an image is labeled as being identical. At the extraction step of the present disclosure, any of 4-connection or 8-connection may be employed, but in terms of finer division of constituent parts (chunks), 4-connection is preferable. For example, image data as illustrated in FIGS. 7 and 8 can be processed by the blob labeling method, and in FIG. 7, twelve constituent parts can be extracted from the image data, and in FIG. 8, as illustrated in FIG. 8(*a*), three constituent parts can be extracted from the image data.

Figure 9:
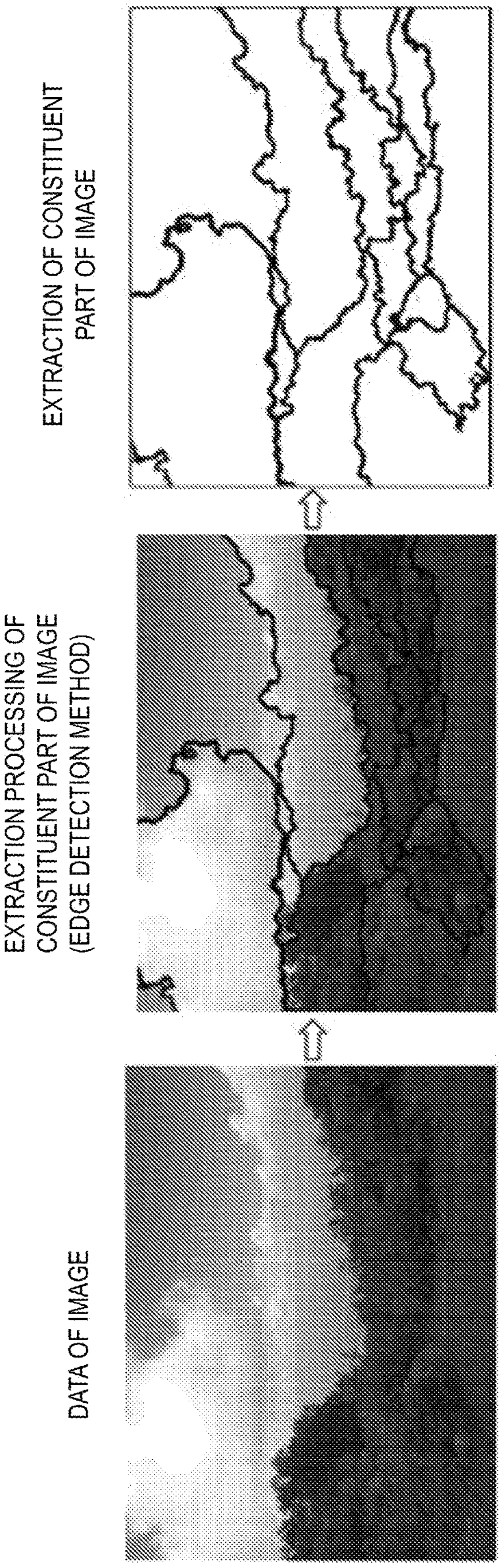
FIG. 9 is a view illustrating extraction of a constituent part of an image from image data by an edge detection method.

At the extraction step of the present disclosure, a known edge detection method can also be employed. The edge detection method is a method employing an algorithm that identifies a location where brightness of an image sharply changes, that is, more formally, a location where brightness of an image discontinuously changes. The edge detection method includes, for example, a search based technique and a zero-crossing based technique, but any of the techniques may be employed at the extraction step of the present disclosure. For example, the edge detection method is preferably employed for image data as illustrated in FIG. 9.

At the extraction step of the present disclosure, a known threshold method can also be employed. The threshold method is a method including converting target image data to only two colors of white and black, and identifying, from the results, an image as one constituent part or a plurality of constituent parts. For example, the image data as illustrated in FIG. 7 can also be processed by the blob labeling method, but can also be processed by the threshold method.

At the extraction step of the present disclosure, the method of extracting a region specified in advance can also be employed. That is, in the printing method of the present disclosure, in a case where a crease is intentionally formed on an image (for example, in a case where a cease is formed as a part of design), the cease is allowed. Specifically, for example, in the case of the image data of FIG. 8, according to the blob labeling method, three constituent parts are extracted from the image data as illustrated in FIG. 8(*a*), and as illustrated in FIG. 8(*b*), four constituent parts may be extracted from the image data by intentionally dividing each of characters on the left side into two constituent parts. The region specified in advance can be specified by, for example, an author of an image (for example, a designer), a printing operator (for example, an actual printing operator), AI (artificial intelligence), or the like.

The method of extracting a region specified in advance can be used suitably in a case where a constituent part length of a constituent part of an image is greater than a nozzle row length of the print head. Here, the "constituent part length" is intended to mean a length (y) in the secondary scanning direction (y-direction) of a constituent part of an image, and the length (y) is obtained by acquiring a maximum value and a minimum value of the length in the secondary scanning direction (y-direction) of the constituent part of the image, and being derived from the maximum value and the minimum value and as illustrated in FIG. 3, the "nozzle row length" is intended to mean a length (y) in the secondary scanning direction (y-direction) from a nozzle topmost portion to a nozzle bottommost portion in a nozzle row constituted of an array of a plurality of nozzles.

In the printing method of the present disclosure, the constituent part length of an image is preferably less than or equal to the nozzle row length of the print head. When the constituent part length of an image is such a length, an unintended crease defect corresponding to the movement direction of the print head can further be reduced or suppressed.

The scanning step of the present disclosure includes at least the step (2) described above. Here, "substantially perpendicular" in the present disclosure means that variation of ±approximately less than or equal to 20 degrees, ±approximately less than or equal to 15 degrees, ±approximately less than or equal to 10 degrees, ±approximately less than or equal to 5 degrees, or ±approximately less than or equal to 1 degree with respect to being perpendicular (90 degrees).

The distance and the number of times of feeding of the printing medium are not particularly limited, and can be set appropriately according to, for example, the size of the printing medium, the size of a constituent part of an image, the size of the print head, and the like. For example, the distance of feeding may be set to a regular distance as illustrated in FIG. 2 or may be set to different distances. The number of times of feeding means an integer, and means once or a plurality of times.

Typically, the number of times of actual feeding of the printing medium may correspond to the number of times of scanning performed by the print head across a printing pass region in the primary scanning direction. In the present disclosure, as described above, for example, in a case where there is no need for discharging ink as illustrated in scan 1 of FIG. 2, during scan 1, the scan can be skipped without moving the print head, but the scan in such a case can also be counted as single scan.

At the scanning step of the present disclosure, when the constituent part of the image is present in a printing pass region that is scannable by the print head passing over the printing medium, and in a case where all of the constituent part of the image is present in the printing pass region, all of the constituent part of the image are printed by discharging ink during scan. Here, that "all of the constituent part of the image is printed" is intended to mean that substantially all of the constituent part of the image is printed. That is, it can be said that all of the constituent part of the image is printed, not only in a case where printing is performed by discharging ink for all of pixels (dots) constituting the constituent part of the image, but also, for example, in a case where even when printing cannot be performed by discharging ink for some of all the pixels due to influence of nozzle clogging or the like, quality is at an acceptable level (for example, in a case where all of the constituent part of the image obtained after printing can be evaluated by visual observation as being printed.

The print head may pass at least once through the printing pass region during single scan, but typically may pass twice (may move back and forth) through the printing pass region during single scan. For example, as illustrated in FIG. 2, the print head may pass through the printing pass region in a −x direction and stop at a left end, or the print head may pass through the printing pass region in the −x direction and then in a +x direction, and stop at a right end. In a case where the print head moves a plurality of times through the printing pass region during single scan, all of a constituent part of an image may be printed during any single movement of the print head, and printing may not be performed during remaining movement of the print head, or all of a constituent part of an image may be printed each time the print head passes through the printing pass region, or a portion of a constituent part of an image may be printed during any single movement of the print head, and a remaining portion of the constituent part of the image may be printed during remaining movement of the print head.

In some embodiments, the scanning step of the present disclosure is further performed such that when the constituent part of the image is present in a printing pass region that is scannable by the print head passing over the printing medium, and in a case where all of the constituent part of the image is not present in the printing pass region, ink is not discharged to the constituent part of the image. Banding can further be remedied by employing such a scanning step. Here, that "ink is not discharged to the constituent part of the image" is intended to mean that ink is not substantially discharged to the constituent part of the image. That is, it can be said that ink is not discharged to the constituent part of the image, not only in a case where when a portion of the constituent part of the image is present in the printing pass region, ink is not discharged for all of pixels (dots) constituting such a constituent part, but also in a case where even when ink with an amount for some pixels is discharged due to some influence, quality is at an acceptable level (for example, in a case where ink can be evaluated by visual observation as not being discharged).

In some embodiments, the scanning step of the present disclosure is further performed such that in a case where all of the constituent part of the image is printable during a plurality of times of scan, all of the constituent part of the image is printed during at least single scan. Specifically, as illustrated in FIG. 2, for example, constituent part 1 of the image may be printed during scan 2 to 4. At this time, constituent part 1 may be printed during any one or two rounds of scan from among scan 2 to 4, or may be printed during all of scan 2 to 4. The number of times of printing can be set appropriately in accordance with printing quality and the like of the constituent part, but the number of times of printing is preferably greater than or equal to twice. As illustrated in FIG. 3, the print head generally has a nozzle row (y) constituted of an array in the y-direction of a plurality of nozzles, but, for example, some of the plurality of nozzles may clog with use. Thus, in a case where printing is performed plurality of times, even when a printing failure location due to nozzle clogging is present at the time of first printing, printing is performed on such a location at the time of subsequent printing by using a different nozzle of the print head, and as a result, printing failure can be remedied.

Figure 6:
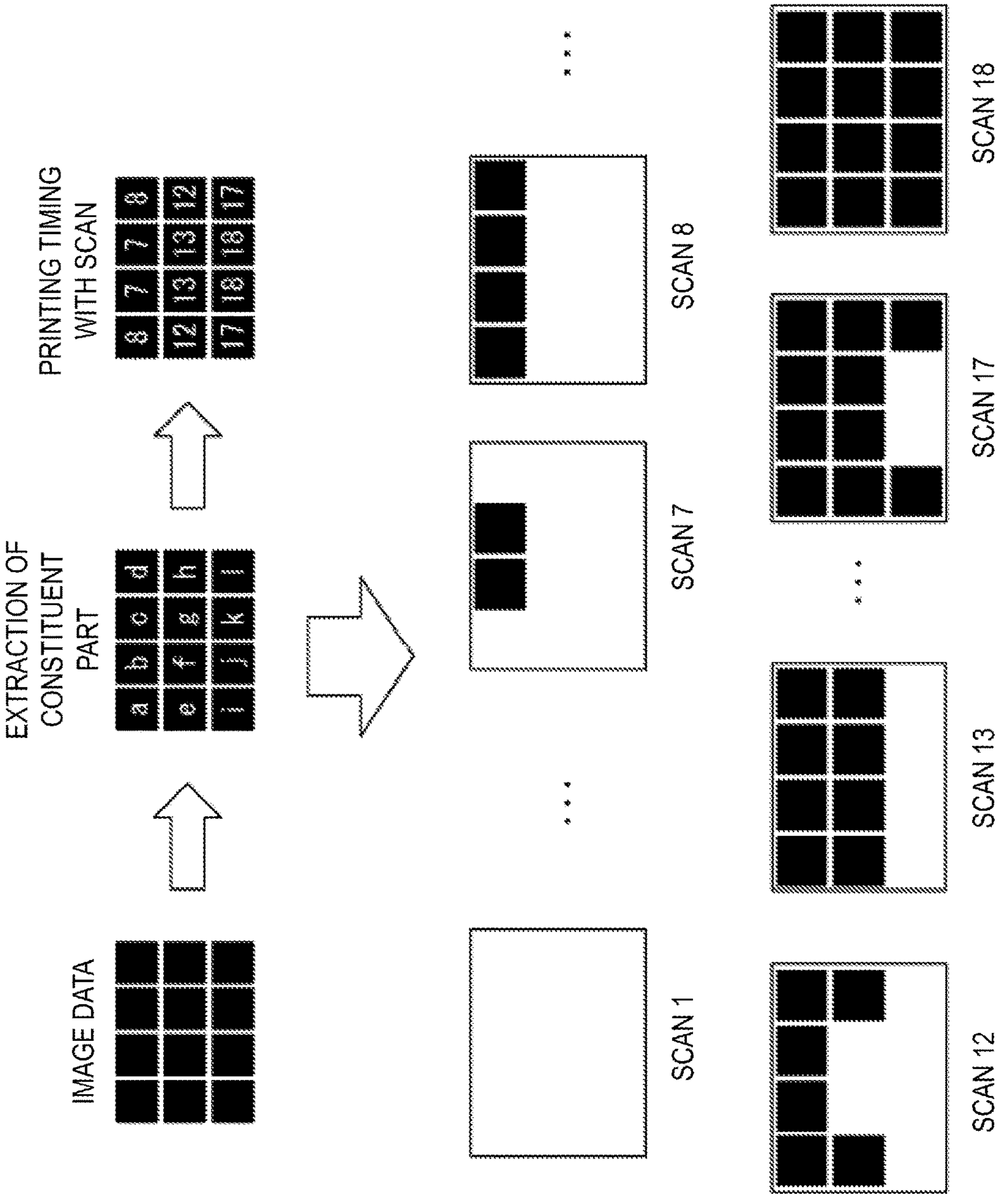
FIG. 6 is a schematic drawing illustrating printing an image by using an inkjet printing method of an embodiment of the present disclosure, and is a schematic drawing of a printing method including a configuration of randomly printing a constituent part of an image in each printing pass region.

In some embodiments, the scanning step of the present disclosure is further performed such that in a case where all of a plurality of the constituent parts of the image are present in a printing pass region that is scannable, and in a case where all of the plurality of constituent parts of the image are also present in a printing pass region during subsequent scan, all of the plurality of constituent parts of the image are individually and randomly printed during each round of scan. Specifically, as illustrated in FIG. 6, twelve constituent parts a to 1 can be extracted from image data. At this time, for example, all of four constituent parts a to d that are present in an identical printing pass region can be printed during scan 7 and 8. In this case, such four constituent parts may be printed at once during any of scan 7 or 8, or, for example, as illustrated in FIG. 6, constituent parts b and c may be printed during scan 7, and constituent parts a and d may be printed during subsequent scan 8. At this time, during scan 8, at least constituent parts a and d may be printed, but in addition to constituent parts a and d, constituent parts b and/or c may be printed. As illustrated in FIG. 6, in a case where the plurality of constituent parts are randomly printed, even when a printing failure location due to nozzle clogging is present at the time of printing during scan 7, printing is performed on such a location at the time of printing during subsequent scan 8 by using a nozzle of the print head that is different from a nozzle having the nozzle clogging, and as a result, printing failure can be reduced or remedied, as compared to the case where all of the plurality of constituent parts are printed during scan 7.

In some embodiments, the printing method of the present disclosure further includes the step of curing ink discharged after printing (may be referred to simply as the "curing step"). In a case where the curing step is employed, curable ink is used as the ink. Means for curing the curable ink is not particularly limited, and, for example, means for irradiating with radiation (ultraviolet light, an electron beam, and the like), and/or heating means can be employed. Each condition in these types of means can be set appropriately according to the type and the like of the curable ink used.

The printing method of the present disclosure may optionally include one additional step or a plurality of additional steps. Examples of the additional step can include the printing medium unwinding step, the drying step, the fault detection step, and the printed material winding step.

The inkjet printing device of the present disclosure is a device that can perform the inkjet printing method described above, and includes at least the following configurations (a) to (d). As for configurations other than such configurations (for example, a memory that stores various types of information for operating the device, a display, and the like), known configurations used in a conventional inkjet printing device can be employed appropriately:

(a) a print head having a nozzle row constituted of an array of a plurality of nozzles, (b) a feeder configured to sequentially feed the printing medium n times by a predetermined distance in a secondary scanning direction, assuming that a direction of the nozzle row in the print head is the secondary scanning direction, and that a direction substantially perpendicular to the secondary scanning direction is a primary scanning direction, (c) a receiver configured to receive a signal of one constituent part or a plurality of constituent parts of an image that are extracted from image data of the image, and (d) a scan controlling unit configured to cause the print head to scan across a printing pass region in the primary scanning direction in accordance with the number of times of actual feeding of the printing medium that is fed by the feeder, the scan controlling unit causing the printing device to execute to print all of a constituent part of an image received by the receiver by discharging ink during scan, when the constituent part of the image is present in a printing pass region that is scannable by the print head passing over the printing medium, and in a case where all of the constituent part of the image is present in the printing pass region.

The print head used in the printing device of the present disclosure is not particularly limited, and a known print head can be used. In the printing device of the present disclosure, one print head or a plurality of print heads can be employed. As illustrated in FIG. 3, the print head generally has a nozzle row constituted of an array of a plurality of nozzles. For example, a nozzle row for R (red) of FIG. 3 is not divided, but a nozzle row may be divided into greater than or equal to two regions, and may be configured such that a discharging amount of ink may be adjusted for each of the regions divided. The size, the number, a pitch distance, a placement pattern, and the like of the nozzle are not particularly limited, and can be set appropriately according to printing performance (for example, printing quality, printing speed) and the like.

The print head illustrated as an example in FIG. 3 is configured to discharge ink of C (cyan), M (magenta), Y (yellow), and K (black) from corresponding nozzle rows, but the print head is not limited to such a configuration. For example, a nozzle row from which transparent ink or colored ink such as ink of light cyan, light magenta, red, green, and orange is discharged can be employed. The print head may have greater than or equal to one nozzle row, and the number of the nozzle rows is not particularly limited. In a case where the print head has a plurality of nozzle rows, ink discharged from each of the nozzle rows may be identical (for example, both two nozzle rows are nozzles rows for transparent ink), or may be different (for example, one of two nozzle rows is a nozzle row for transparent ink, and the other nozzle row is a nozzle row for black ink). The ink in the printing method described above can be employed as ink applicable to the print head.

In the present disclosure, as illustrated in FIG. 3, a length from a nozzle topmost portion to a nozzle bottommost portion in a nozzle row is referred to as a nozzle row length. The nozzle row length is not particularly limited, and may be set appropriately in accordance with the size and the like of the printing medium or the printing device. The nozzle row length can generally be set to, for example, approximately less than or equal to 30 cm, approximately less than or equal to 20 cm, or approximately less than or equal to 10 cm, and can be set to approximately greater than or equal to 1 cm, approximately greater than or equal to 3 cm, or approximately greater than or equal to 5 cm. When a constituent part length of an image received by the receiver as describe below is less than or equal to the nozzle row length of the print head, an unintended crease defect corresponding to the movement direction of the print head can further be reduced or suppressed, and thus this is advantageous.

The printing device of the present disclosure includes the feeder configured to sequentially feed the printing medium n times by a predetermined distance in the secondary scanning direction (+y direction). Such a feeder is not particularly limited as long as the feeder can perform a feeding operation in the printing method described above, and, for example, a known feeder used in a conventional inkjet printing device can be employed.

The printing device according to the present disclosure includes the receiver configured to receive a signal of one constituent part or a plurality of constituent parts of an image that are extracted from image data of the image. Such a receiver is not particularly limited as long as the receiver is configured to be able to receive a signal of an extracted constituent part of an image, and subsequently provide the scan controlling unit with information of the constituent part based on the signal received, and for example, a known receiver that is used in a conventional inkjet printing device and that can receive image data can be employed. In the printing device, the receiver may be provided as a separate body from the scan controlling unit, or may be provided as a single body with the scan controlling unit.

The signal of the image constituent part provided to the receiver can be obtained by performing extraction processing. Such extraction processing may be performed by at least one selected from the group consisting of the blob labeling method, the edge detection method, the threshold method, and the method of extracting a region specified in advance, as described above.

The extraction processing of the constituent part of the image may be performed inside or outside the printing device. In a case where the extraction processing is performed inside the printing device, an extraction processing unit configured to perform the extraction processing may be provided as a separate body from the receiver described above, or may be provided as a single body with the receiver. In a case where the extraction processing is performed outside the printing device, the extraction processing can be performed by using, for example, a personal computer, a tablet, a smartphone (mobile phone), a cloud system, or the like that includes a system constituted to be able to perform the extraction processing. The signal of the image constituent part obtained by the extraction processing performed outside the printing device may be provided to the receiver in a wired manner or in a wireless manner.

The printing device of the present disclosure includes the scan controlling unit configured to cause the print head to scan across a printing pass region in the primary scanning direction in accordance with the number of times of actual feeding of the printing medium that is fed by the feeder. Such a scan controlling unit is not particularly limited as long as the scan controlling unit can perform the scanning step in the printing method described above.

The scan controlling unit of the present disclosure can control the printing device to print all of a constituent part of an image received by the receiver by discharging ink during scan, when the constituent part of the image is present in a printing pass region, and in a case where all of the constituent part of the image is present in the printing pass region.

In some embodiments, the scan controlling unit of the present disclosure further controls the printing device not to discharge ink during scan to a constituent part of an image received by the receiver, when the constituent part of the image is present in a printing pass region, and in a case where all of the constituent part of the image is not present in the printing pass region. Banding can further be remedied by employing such a scan controlling unit.

In some embodiments, the scan controlling unit of the present disclosure further controls the printing device to print all of the constituent part of the image during at least single scan, in a case where all of the constituent part of the image is printable during a plurality of times of scan. In a case where printing is performed plurality of time, even when a printing failure location due to nozzle clogging is present at the time of first printing, printing is performed on such a location at the time of subsequent printing by using a different nozzle of the print head, and as a result, printing failure can be remedied.

In some embodiments, the scan controlling unit of the present disclosure further controls the printing device to individually and randomly print all of a plurality of the constituent parts of the image during each round of scan, in a case where all of the plurality of constituent parts of the image are present in a printing pass region that is scannable, and in a case where all of the plurality of constituent parts of the image are also present in a printing pass region during subsequent scan. For example, as illustrated in FIG. 6, in a case where the plurality of constituent parts that are present in an identical printing pass region are randomly printed, even when a printing failure location due to nozzle clogging is present at the time of printing during scan 7, printing is performed on such a location at the time of printing during subsequent scan 8 by using a nozzle of the print head that is different from a nozzle having the nozzle clogging, and as a result, printing failure can be reduced or remedied, as compared to the case where all of the plurality of constituent parts are printed during scan 7.

In some embodiments, the printing device of the present disclosure further includes a curing unit configured to cure ink discharged after printing. In a case the curing unit is employed, curable ink is used as the ink. In the printing device, the curing unit may be provided as a separate body from the scan controlling unit or may be provided as a single body with the scan controlling unit.

Means for curing the curable ink in the curing unit is not particularly limited, and, for example, means for irradiating with radiation (ultraviolet light, an electron beam, and the like), and/or heating means can be employed. Each condition in these types of means can be set appropriately according to the type and the like of the curable ink used.

In some embodiments, the printing device of the present disclosure includes construction in which at least one of the printing medium and the print head is movable in a z-direction. Here, the "z-direction" is intended to mean a direction substantially perpendicular to the x-direction and the y-direction, and encompasses a +z direction and a −z direction. That is, being "movable in a z-direction" is intended to mean being movable in any of the +z direction or the −z direction. As for the "+z direction" and the "−z direction," for example, when the printing medium is disposed horizontally with respect to the ground, an upward direction of the printing medium can be defined as the +z direction, and a downward direction of the printing medium can be defined as the −z direction.

For example, contamination and the like in the device due to ink discharged and heaped up on the printing medium at the time of three-dimensional printing can be reduced and prevented by employing the construction in which at least one of the printing medium and the print head is movable in the z-direction. In addition, in a case where such a construction is employed when printing is performed on a printing medium having a three-dimensional shape such as an uneven surface, printing quality can be improved, as compared to the case where printing is performed by a printing device that does not include such a construction. In three-dimensional printing, the printing medium preferably moves in the −z direction, and the print head preferably moves in the +z direction. Such movement may be movement that is made at once by a predetermined distance, or may be gradual movement. In printing on a printing medium having a three-dimensional shape, the printing medium and/or the print head preferably move in the +z direction and/or the −z direction in accordance with the three-dimensional shape of the printing medium.

The printing device of the present disclosure may optionally include one additional configuration or a plurality of additional configurations. Examples of the additional configuration can include a printing medium unwinding unit, a drying unit, a fault detection unit, and a printed material winding unit.

Figure 4:
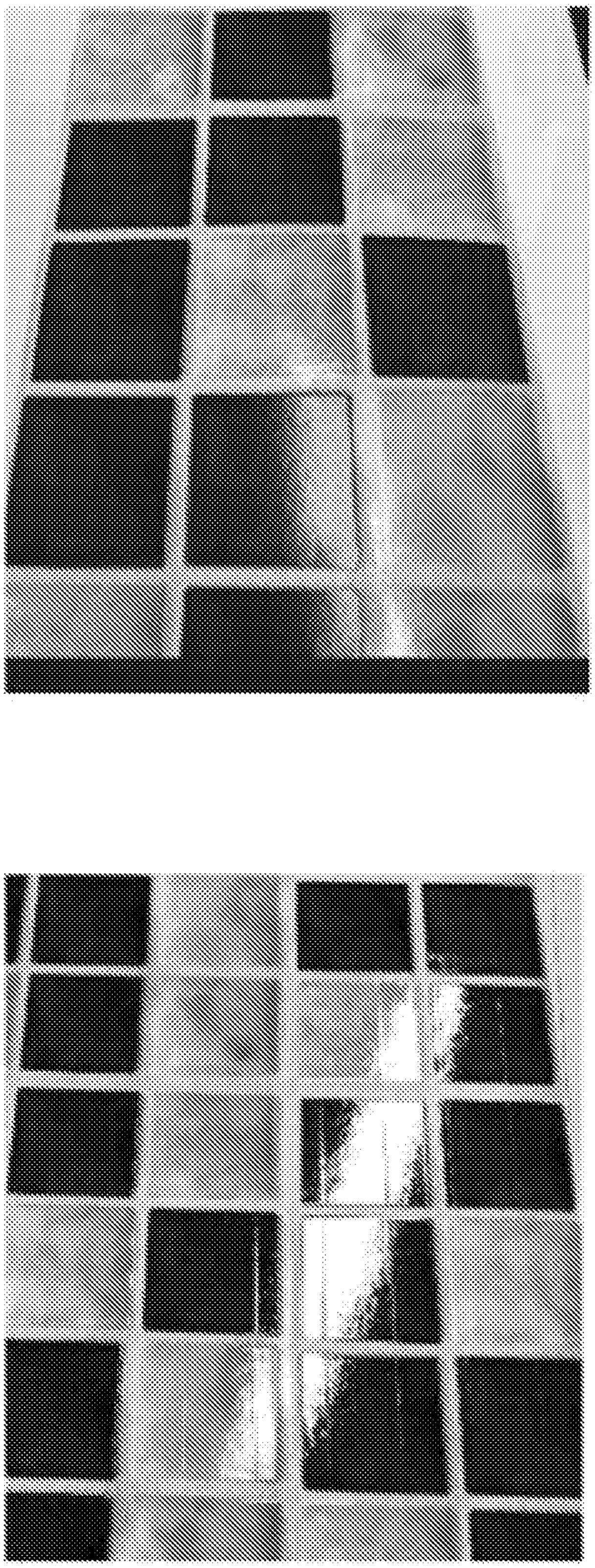
FIG. 4(*a*) is a photograph of an image printed by using a conventional inkjet printing method and printing device of a scanning system, and FIG. 4(*b*) is a photograph of an image printed by using an inkjet printing method and printing device of a scanning system of an embodiment of the present disclosure.

FIG. 4(*a*) is a photograph of an image printed by using a conventional inkjet printing method and printing device of a scanning system, and FIG. 4(*b*) is a photograph of an image printed by using an inkjet printing method and printing device of a scanning system of an embodiment of the present disclosure. As can be seen from these photographs, when an image is printed by using the inkjet printing method and printing device of a scanning system of the present disclosure, an unintended crease defect (banding) corresponding to the movement direction of the print head can be remedied suitably.

It is apparent for a person skilled in the art that various variations of the embodiments described above can be made without departing from the basic principles of the present invention. In addition, it is apparent for a person skilled in the art that various modifications and variations of the present invention can be made without departing from the spirit and scope of the present invention.

REFERENCE SIGNS LIST

1 Printing pass region (printing pass region during scan 1)
2 Printing pass region (printing pass region during scan 2)

The invention claimed is:

1. An inkjet printing device of printing an image on a printing medium by a scanning system, the inkjet printing device comprising:

a print head having a nozzle row constituted of an array of a plurality of nozzles;

a feeder configured to sequentially feed the printing medium n times by a predetermined distance in a secondary scanning direction, assuming that a direction of the nozzle row in the print head is the secondary scanning direction, and that a direction substantially perpendicular to the secondary scanning direction is a primary scanning direction;

a receiver configured to receive a signal of one constituent part or a plurality of constituent parts of an image that are extracted from image data of the image; and a scan controlling unit configured to cause the print head to scan across a printing pass region in the primary scanning direction in accordance with the number of times of actual feeding of the printing medium that is fed by the feeder, the scan controlling unit causing the printing device to execute to print all of a constituent part of an image received by the receiver by discharging ink during scan, when the constituent part of the image is present in a printing pass region that is scannable by the print head passing over the printing medium, and in a case where all of the constituent part of the image is present in the printing pass region, wherein extraction processing of the constituent part of the image is performed by an edge detection method that identifies where a brightness of the image discontinuously changes.

2. The printing device according to claim 1, wherein the scan controlling unit causes the printing device to execute not to discharge ink during scan to a constituent part of an image received by the receiver, when the constituent part of the image is present in a printing pass region that is scannable by the print head passing over the printing medium, and in a case where all of the constituent part of the image is not present in the printing pass region.

3. The printing device according to claim 1, wherein the scan controlling unit causes the printing device to execute to print all of the constituent part of the image during at least single scan, in a case where all of the constituent part of the image is printable during a plurality of times of scan.

4. The printing device according to claim 1, wherein the scan controlling unit causes the printing device to execute to individually and randomly print all of a plurality of the constituent parts of the image during each round of scan, in a case where all of the plurality of constituent parts of the image are present in a printing pass region that is scannable, and in a case where all of the plurality of constituent parts of the image are also present in a printing pass region during subsequent scan.

5. The printing device according to claim 1, wherein extraction processing of the constituent part of the image is performed inside or outside the printing device.

6. The printing device according to claim 1, wherein in a constituent part of an image received by the receiver, a maximum value and a minimum value of a length in the secondary scanning direction of the constituent part of the image are acquired, and a constituent part length in the secondary scanning direction of the constituent part of the image is derived from the maximum value and the minimum value, and is less than or equal to a nozzle row length in the secondary scanning direction of the nozzle row of the print head.

7. The printing device according to claim 1, wherein the ink includes curable ink, and the printing device comprises a curing unit configured to cure ink discharged after printing.

8. The printing device according to claim 1, including construction in which at least one of the printing medium and the print head is movable in a z-direction.

9. An inkjet printing device of printing an image on a printing medium by a scanning system, the inkjet printing device comprising:

a print head having a nozzle row constituted of an array of a plurality of nozzles;

a feeder configured to sequentially feed the printing medium n times by a predetermined distance in a secondary scanning direction, assuming that a direction of the nozzle row in the print head is the secondary scanning direction, and that a direction substantially perpendicular to the secondary scanning direction is a primary scanning direction;

a receiver configured to receive a signal of one constituent part or a plurality of constituent parts of an image that are extracted from image data of the image; and a scan controlling unit configured to cause the print head to scan across a printing pass region in the primary scanning direction in accordance with the number of times of actual feeding of the printing medium that is fed by the feeder, the scan controlling unit causing the printing device to execute to print all of a constituent part of an image received by the receiver by discharging ink during scan, when the constituent part of the image is present in a printing pass region that is scannable by the print head passing over the printing medium, and in a case where all of the constituent part of the image is present in the printing pass region, wherein extraction processing of the constituent part of the image is performed by a blob labeling method that assigns an identical number to pixels in the image including continuous white portions or continuous black portions.

10. An inkjet printing device of printing an image on a printing medium by a scanning system, the inkjet printing device comprising:

a print head having a nozzle row constituted of an array of a plurality of nozzles;

a feeder configured to sequentially feed the printing medium n times by a predetermined distance in a secondary scanning direction, assuming that a direction of the nozzle row in the print head is the secondary scanning direction, and that a direction substantially perpendicular to the secondary scanning direction is a primary scanning direction;

a receiver configured to receive a signal of one constituent part or a plurality of constituent parts of an image that are extracted from image data of the image; and a scan controlling unit configured to cause the print head to scan across a printing pass region in the primary scanning direction in accordance with the number of times of actual feeding of the printing medium that is fed by the feeder, the scan controlling unit causing the printing device to execute to print all of a constituent part of an image received by the receiver by discharging ink during scan, when the constituent part of the image is present in a printing pass region that is scannable by the print head passing over the printing medium, and in a case where all of the constituent part of the image is present in the printing pass region, wherein extraction processing of the constituent part of the image is performed by a threshold method that converts the image to only two colors of white and black.

* * * * *